United States Patent [19]

Leroux

[11] 4,292,532

[45] Sep. 29, 1981

[54] TWO-STAGE ELECTRIC GENERATOR SYSTEM

[75] Inventor: Adrien Leroux, Sherbrooke, Canada

[73] Assignee: h.o.p. ConsuLab Inc., Quebec, Canada

[21] Appl. No.: 136,707

[22] Filed: Apr. 2, 1980

[30] Foreign Application Priority Data

Mar. 14, 1980 [CA] Canada .................................. 347792

[51] Int. Cl.³ .......................... H02P 9/04; H02K 19/12
[52] U.S. Cl. ........................................ 290/6; 310/165; 310/190
[58] Field of Search ................. 290/6; 310/165, 68 D, 310/152, 154, 190, 191, 68 R, 262, 266

[56] References Cited

U.S. PATENT DOCUMENTS 3,356,877 12/1967 Burr ..................................... 310/154
3,444,410 3/1967 Crawford .......................... 310/68 R Primary Examiner—J. V. Truhe
Assistant Examiner—Donald L. Rebsch Attorney, Agent, or Firm—Cushman, Darby & Cushman

[57] ABSTRACT

The system described herein is particularly adapted to convert mechanical energy from a wind or hydraulic driven turbine into electric energy and comprises: an exciter generator and a main generator in a housing traversed by a rotatable shaft; the exciter generator consists of permanent magnet mounted to the housing envelope and of a rotor mounted to the shaft and having a one-phase winding, the rotor being made of non-magnetic material to eliminate cogging and static torque associated with permanent magnet excitation; the main generator consists of a three-phase stator winding on a magnetic core mounted to the housing envelope and of a pole-type rotor mounted to the shaft, the rotor having a winding wound on a magnetic core; a rectifying bridge is rotatably mounted to the shaft and is connected to the one-phase winding of the rotor of the exciter generator and to the winding of the main generator rotor so that the rotation of the shaft as a result of mechanical energy generates a three-phase electric energy output from the stator winding.

4 Claims, 2 Drawing Figures

TWO-STAGE ELECTRIC GENERATOR SYSTEM

This invention relates to an electric generator matched to turbine power.

Wind energy and hydraulic energy, when converted to mechanical energy with a propeller-type turbine, yield a normalized relation between power and speed in the third power of the speed. An electric generator system coupled to such a turbine must satisfy three basic requirements. First, the normalized power vs speed curve of the generator should intercept the power vs speed curve of the turbine in such a way as to assure a stable operating point around the design speed. Secondly, the system should be free of static torque to be able to start without help and, finally, it should be maintenance free for the design life of the unit.

It is an object of the present invention to provide a two-stage electric generator system to convert mechanical energy from a wind or hydraulic driven turbine into electric energy. Such system comprises: an exciter generator and a main generator, the exciter generator consisting of permanent magnet means mounted to the system housing and of a rotor rotatably supported on a shaft rotatable in the housing; the rotor is made of non-magnetic material to eliminate cogging and static torque associated with permanent magnet excitation and includes a one-phase winding distributed around the circumference thereof; the main generator consists of a three-phase stator winding on a magnetic core mounted to the housing and of a pole-type rotor rotatably supported on the shaft and having a winding wound on a magnetic core; a rectifying bridge is mounted on the shaft while first means electrically connect the one phase winding to the rectifying bridge and second means electrically connect the rectifying bridge to the winding of the main generator rotor whereby rotation of the shaft as a result of mechanical energy applied thereon generates a three-phase electric energy output from the stator winding.

There are a series of possible applications for the system of the present invention. For example, in the case of heating in the far north where wind power is available, the present system may be mounted to a tower equipped with a wind turbine and be permanently connected to some heating element so that wind energy may be converted into hot water at the rate available in the wind. Such heating can be three-phase power if the heat sink is near or by D.C. transmission if the heat sink is far.

The present system is also applicable for pumping water wherein the D.C. wind power, made possible in the above described example, can be applied to a D.C. permanent magnet or series motor pump inside a shaft to make water available where wind is available.

The present system may be used with a water propeller type turbine under a constant water head (small dam power); it can be made to deliver approximately line frequency when using an electric controller to maintain output power and input power equal by shunting output power to heating anything (even a river) when output is not required elsewhere.

Also, if wind or water are available and if the generated energy is not usable at the site, it can convert to other energy, mostly by chemical means, such as electrolysis.

Other objects and further scope of applicability of the present invention will become apparent from the detailed description given hereinafter; it should be understood, however, that the detailed description while indicating preferred embodiments of the invention is given by way of illustration only since various changes and modifications within the spirit and scope of the invention will become apparent to those skilled in the art.

BRIEF DESCRIPTION OF THE DRAWINGS

FIG. 1 represents a normalized relation between power and speed in the third power of the speed when a propeller type turbine is used to convert wind and hydraulic energy to mechanical energy. That is if $P_m$ = mechanical power available at speed $\omega$ and
$P_{mn}$ = mechanical power available at nominal design speed $\omega_n$ then $$\frac{P_n}{P_{mn}} = \left(\frac{\omega}{\omega_n}\right)$$

Referring to FIG. 2, a two-stage electric generator system made in accordance with the present invention is shown where mechanical energy input, such as obtained from a turbine of the type described above, is fed at A and a three-phase electric energy output is taken out at B. The reference numeral 10 designates generally an enclosed housing for the two-stage electric generator system. The opposite end sections 12 and 14 of the housing 10 support ball-bearing assemblies 16 and 18, respectively, which engage a rotatable shaft 20 which is driven at its end 22 by being appropriately connected to a turbine (not shown). Housing 10 encloses an exciter generator 24 and a main generator 26. The exciter generator consists of permanent magnet assembly 28 which may consist of one or more rings and which is mounted to the inside wall of the housing envelope and of a rotor 30 which is rotatably mounted to the shaft 20. The rotor 30 is made of a non-magnetic material to eliminate the cogging and static torque which are usually associated with permanent magnet excitation. Rotor 30 includes a one phase winding 32 distributed around the circumference thereof.

Figure 1:
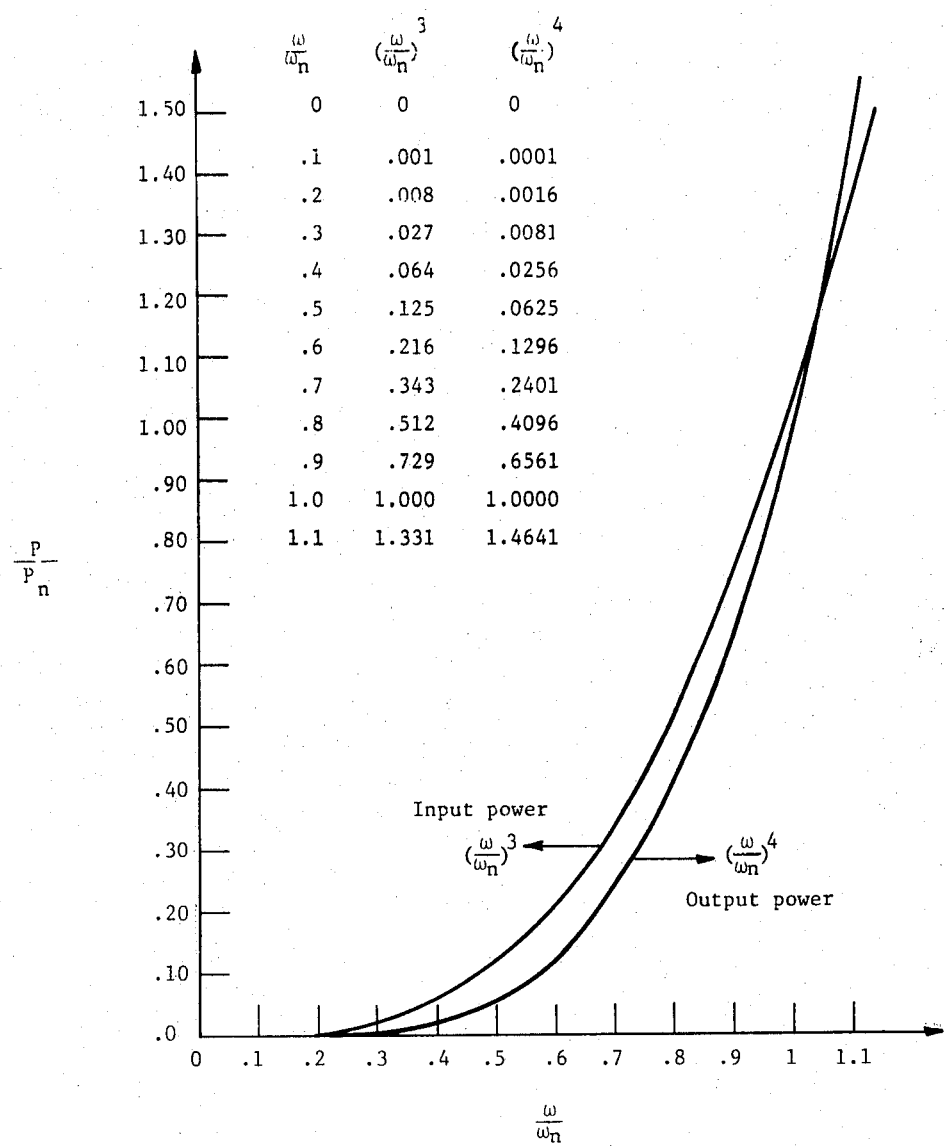
FIG. 1 is a graph showing a power vs speed curve to explain the basic principle of the present invention.

The main generator 26 consists of a three-phase stator winding on a magnetic core 34 which is mounted to the inside wall of the housing envelope and of a pole-type rotor 36, salient or not, which is rotatably supported on the shaft 20. The rotor has a winding wound on a magnetic core.

Also, rotatably mounted to shaft 20 is a rectifying bridge 38 which is electrically connected at 40 and 42 to the one-phase winding 32 and to the winding of the main generator rotor 36, respectively.

With the permanent magnet assembly 28 in place and the rotor rotating, an alternating voltage is available in the single phase winding 30. This voltage is rectified by the rotating bridge 38 and the rectified voltage is proportional to the speed, that is $V_{dc} = k \, \phi_m \omega$, where $V_{dc}$ = rectified voltage from exciter
$\phi_m$ = flux of magnet
$\omega$ = rotating speed of the system.

The D.C. voltage is directly applied to the field of the main generator 36 and produces a magnetizing field $\phi_g$ proportional to its amplitude (neglecting saturation) so:

$$\phi_g \simeq k_2 V_{dc} \simeq k_1 k_2 \phi_m \omega$$

Then, the three phase winding 34 has a voltage proportional to $\phi_g$ and $\omega$.

$$V \simeq k_3 \phi_g \omega$$

then, $$V \simeq k_1 k_2 k_3 \phi_m \omega^2$$

so the generated three phase voltage is proportional to $\phi_m$ (permanent magnet flux) and $\omega^2$ (speed of the system) and physical constant $k_1 k_2 k_3 = k$.

Figure 2:
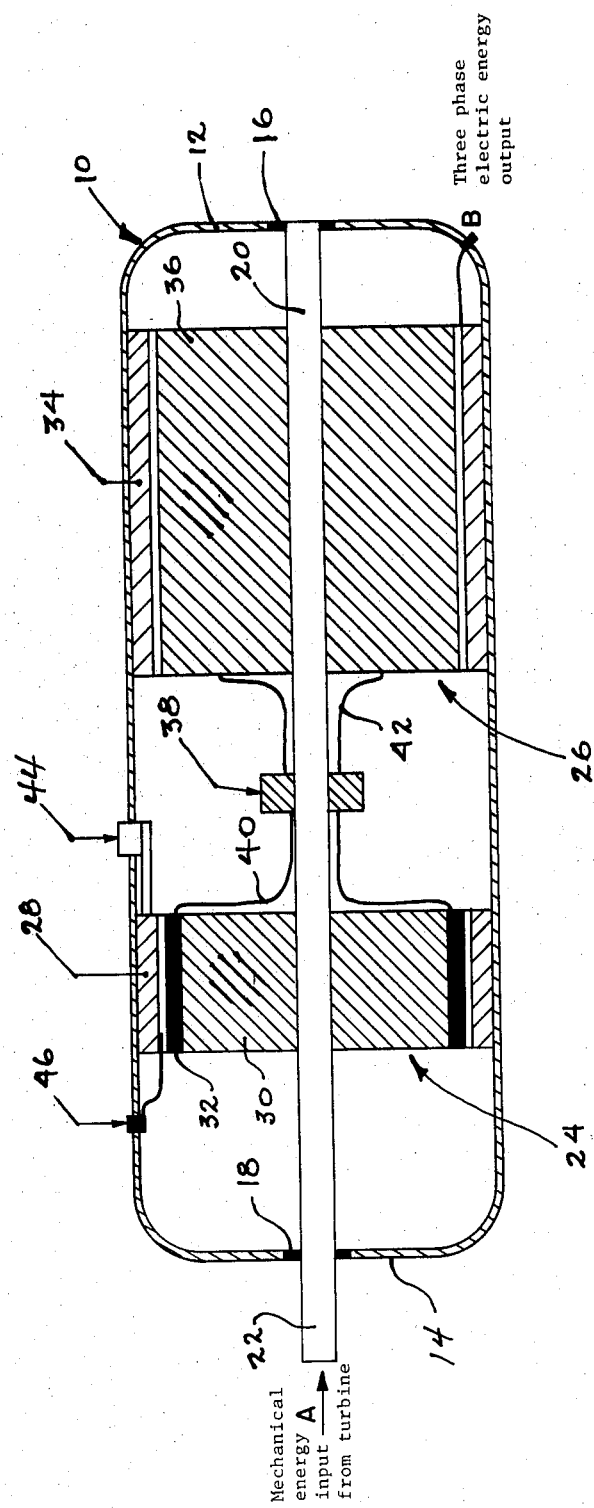
FIG. 2 is a sectional schematic representation of a system made in accordance with the present invention.

Referring to FIG. 2, a mechanical link 44 is available through the housing envelope 10 to move the magnet ring 28 inside the housing away from the rotor 30. Also, reference numeral 46 represents an element whereby a magnetic shunt can be moved between the permanent magnet ring 28 and the rotor 30, or between the magnets themselves in the case where more than one magnet ring is used. Elements 44,46 are two means of weakening the flux from the magnet insofar as the rotating rotor 30 is concerned. Either one of these controls is sufficient for the purpose of controlling the power curve of the generator.

For an operating speed $\omega$, V can be changed by using one or both of the two means 44 or 46 of control on $\phi_m$.

To match the generator to the turbine, the electric output is kept tied to a fixed impedance. If $P_e$=electric power output at B is calculated, the mathematical expression is $$P_e \simeq \frac{V^2}{Z} \simeq K\omega^4$$

and that the normalized curve $$\frac{P_e}{P_{en}} = \left(\frac{\omega}{\omega_n}\right)^4$$

(see FIG. 1).

It can therefore be seen that the input power and the output power curve will yield a stable operating point.

The embodiments of the invention in which an exclusive property or privilege is claimed are defined as follows:

1. A two-stage electric generator system for converting mechanical energy from a wind or hydraulic driven turbine into electrical energy comprising, in combination:
   housing means;
   an exciter generator and a main generator in said housing means;
   a shaft rotatable in said housing means;
   said exciter generator consisting of permanent magnet means mounted to said housing means and of a rotor rotatably supported on said shaft, said rotor being made of non-magnetic material to eliminate cogging and static torque associated with permanent magnet excitation, said rotor including a one-phase winding distributed around the circumference thereof;
   said main generator consisting of a three-phase stator winding on a magnetic core mounted to said housing means and of a pole-type rotor rotatably supported on said shaft and having a winding wound on a magnetic core;
   a rectifying bridge rotatably mounted to said shaft;
   first means electrically connecting said one-phase winding to said rectifying bridge; and
   second means electrically connecting said rectifying bridge to said winding to said main generator rotor whereby rotation of said shaft as a result of mechanical energy applied thereon generates a three-phase electric energy output from said stator winding; and
   means for controlling the normalized power versus speed curve of the generator so that the curve intercepts the power versus speed curve of the turbine to assure a stable operating point around design speed.

2. A two-stage electric generator system for converting mechanical energy from a wind or hydraulic driven turbine into electrical energy comprising, in combination:
   housing means;
   an exciter generator and a main generator in said housing means;
   a shaft rotatable in said housing means;
   said exciter generator consisting of permanent magnet means mounted to said housing means and of a rotor rotatably supported on said shaft, said rotor being made of non-magnetic material to eliminate cogging and static torque associated with permanent magnet excitation, said rotor including a one-phase winding distributed around the circumference thereof;
   said main generator consisting of a three-phase stator winding on a magnetic core mounted to said housing means and of a pole-type rotor rotatably supported on said shaft and having a winding wound on a magnetic core;
   a rectifying bridge rotatably mounted to said shaft;
   first means electrically connecting said one-phase winding to said rectifying bridge;
   second means electrically connecting said rectifying bridge to said winding of said main generator rotor whereby rotation of said shaft as a result of mechanical energy applied thereon generates a three-phase electric energy output from said stator winding, the normalized power versus speed curve of the generator intercepting the power versus speed curve of the turbine to assure a stable operating point around design speed; and
   means outside said housing and connected to said permanent magnet means to move said permanent magnet means away from said rotor of said exciter generator.

3. A two-stage electric generator system for converting mechanical energy from a wind or hydraulic driven turbine into electrical energy comprising, in combination:
   housing means;
   an exciter generator and a main generator in said housing means;
   a shaft rotatable in said housing means;
   said exciter generator consisting of permanent magnet means mounted to said housing means and of a rotor rotatably supported on said shaft, said rotor being made of non-magnetic material to eliminate cogging and static torque associated with permanent magnet excitation, said rotor including a one-phase winding distributed around the circumference thereof;

said main generator consisting of a three-phase stator winding on a magnetic core mounted to said housing means and of a pole-type rotor rotatably supported on said shaft and having a winding wound on a magnetic core;

a rectifying bridge rotatably mounted to said shaft;

first means electrically connecting said one-phase winding to said rectifying bridge; and second means electrically connecting said rectifying bridge to said winding of said main generator rotor whereby rotation of said shaft as a result of mechanical energy applied thereon generates a three-phase electric energy output from said stator winding, the normalized power versus speed curve of the generator intercepting the power versus speed curve of the turbine to assure a stable operating point around design speed; and magnetic shunt means movable between said permanent magnet means and said rotor winding of said exceiter generator for weakening the flux of said permanent magnet means with respect to said exciter generator rotor.

4. A system as in claim 1, further including control means for controlling the power curve of the system to produce a stable operating point.

* * * * *